United States Patent Office 3,170,940
Patented Feb. 23, 1965

3,170,940
HYDROCARBYLMERCAPTOETHYL SUBSTITUTED SILICON COMPOUNDS
Hugh W. Johnston, Montclair, N.J., assignor to Union Carbide Corporation, a corporation of New York
No Drawing. Filed Apr. 15, 1954, Ser. No. 423,515
4 Claims. (Cl. 260—448.2)

This invention relates to new compounds containing both sulfur and silicon and to polymeric materials prepared therefrom.

The new compounds of this invention have the structural formula $$RSCH_2CH_2Si(OR')_3$$

Where R and R' are hydrocarbyl radicals such as those taken from a group consisting of alkyl and aryl radicals. If R and R' are alkyl radicals, the new compounds may be termed alkylmercaptoethyl trialkoxysilanes or if both R and R' are aryl radicals they may be termed arylmercaptoethyl triaryloxy silanes. Such compounds have found particular use as starting materials for the preparation of modified organopolysiloxanes which are especially suitable for numerous coating applications. Both the monomeric and polymeric materials will also find use as modifiers for natural and synthetic rubbers.

To prepare the new compounds which contain both silicon and sulfur, a mercaptan is reacted with a vinyl hydrocarbyloxysilane under the influence of ultra-violet light with or without the aid of a solvent. The mercaptans which may be employed to react with vinyl hydrocarbyloxysilanes are the alkyl and aryl mercaptans and include such compounds as ethyl mercaptan, propyl mercaptan, isopropyl mercaptan, butyl mercaptan, isobutyl mercaptan, phenyl mercaptan, methylphenyl mercaptan and the like. Examples of the vinyl hydrocarbyloxysilanes which may be employed include vinyl trimethoxysilane, vinyltriethoxysilane, vinyltriphenoxysilane and the like.

The reaction may be depicted as follows:

$$RSH + CH_2=CHSi(OR')_3 \rightarrow RSHCH_2CH_2Si(OR')_3$$

Where R and R' are hydrocarbyl radicals such as those taken from the group consisting of alkyl and aryl radicals. If desired the rate of the reaction may be increased by adding small amounts of an accelerator to the reaction mixture. Effective accelerators are benzil, dibenzoyl disulfide and diphenyl disulfide.

As herein above disclosed the new compounds of this invention may be employed as starting materials for the preparation of sulfur- and silicon-containing polymers. This may be accomplished by the hydrolysis of such compounds in a solvent solution with the aid of an acid or basic catalyst. In the hydrolysis reaction the alkoxy or aryloxy groups, bonded to the silicon atoms of the starting material, are replaced by hydroxyl groups which condense intermolecularly to yield cross-linked polymers containing the repeating unit $$R-S-CH_2CH_2SiO_{1.5}$$

It is also within the scope of this invention to prepare copolymers of the sulfur- and silicon-containing compounds with hydrocarbyl substituted alkoxy- and aryloxysilanes. Examples of such substituted silanes include methyl-, ethyl- and phenyltrialkoxysilanes, dimethyl-, diethyl- and diphenyldialkoxysilanes, trimethyl-, triethyl- and triphenylalkoxysilanes as well as the corresponding hydrocarbon substituted aryloxysilanes. If desired, mixtures of such sbustituted silanes may be cohydrolyzed with the new compounds of this invention.

The method whereby the cohydrolysis of hydrocarbyl substituted alkoxy- and aryloxysilanes with mercaptoethyl alkoxy- and aryloxysilanes is effected may vary in accordance with several techniques. For example, a mixture of the starting materials may be added to a flask containing a suitable solvent, and water subsequently added slowly to the mixture. A catalyst is generally employed and may be added either before the addition of the water or it may be added with the water as a dilute solution thereof. The reaction is exothermic and it is desirable to control the temperature thereof by means of a cooling bath.

Copolymeric materials prepared in accordance with this invention will exhibit various properties depending upon the particular hydrocarbyl substituted silane employed. Thus if a trifunctional silane, such as methyltriethoxysilane, is cohydrolyzed with the new sulfur- and silicon-containing compounds, materials which are extremely suitable as coating compositions are obtained. On the other hand if a difunctional silane such as dimethyl diethoxysilane is cohydrolyzed with the new compounds viscous liquid products are obtained which may be employed as lubricating oil modifiers.

The following examples illustrate the instant invention.

EXAMPLE I

In a quartz 150 x 18 mm. test tube were placed 10.5 ml. (9.5 grams) 0.05 mole) of vinyltriethoxysilane, 4.5 grams (0.05 mole) of n-butyl mercaptan and 10 ml. of dry cyclohexane. The test tube was stoppered and exposed to ultra-violet light for one week. Distillation of the reaction mixture through a 10" Vigreaux column gave the following:

Table I.—Distillation of reaction products

| Fraction | B.P., °C. | Press, mm. Hg | Wt., Grams | Identity |
|---|---|---|---|---|
| 0 | up to 68 | Atm. | 5.1 | Solvent and Mercaptan. |
| 1 | 68 | 13 | 1.0 | Vinyl Triethoxysilane. |
| 2 | 138–140 | 8 | 6.1 | n-Butyl mercaptoethyl Triethoxysilane. |
| 3 | 141–148 | 7 | 4.7 | Unidentified. |

The identity of fraction 2 was established by analysis, which gave a sulfur content of 11.22 wt. percent, a silicon content of 10.0 wt. percent, and a molecular weight of 275. This compares favorably to the formula for n-butylmercaptoethyl triethoxysilane, $C_{12}H_{28}O_3SSi$ which compound has a calculated sulfur content of 11.43 wt. percent, a silicon content of 10.0 wt. percent and a molecular weight of 280.5. It was found that an acetone solution of the product would not de-colorize dilute aqueous potassium permanganate while an acetone solution of vinyltriethoxysilane did de-colorize dilute aqueous potassium permanganate.

EXAMPLE II

In a large quartz test tube were placed 28.5 grams (0.15 mols) of vinyl triethoxysilane, 17.5 grams (0.15 mole) of n-butyl mercaptan and 30 ml. of dry cyclohexane. The test tube was stoppered and the mixture irradiated under a mercury lamp for 6 days. Distillation of the product through a ten-inch helix-packed column yielded 14.7 grams of n-butylmercaptoethyl triethoxysilane having a boiling point of 130.5–131.5° C. at 5 mm. absolute pressure.

EXAMPLE III

In a quartz 18 x 150 mm. test tube were placed 9.5 grams (0.05 mole) of vinyl triethoxysilane 5.5 grams (0.05 mole) of thiophenol and 10 ml. of dry cyclohexane. The tube was stoppered and the mixture irradiated with ultra-violet light for 36 hours. Distillation of the product in a ten-inch helix-packed column gave 9 grams of phenylmercaptoethyl triethoxysilane having a boiling point of 137–140° C. at 1.5 mm. absolute pressure and a refractive index $n_D^{25}$ 1.4946. Analysis of the product indicated a sulfur content of 10.65 wt. percent which value compares favorably to the calculated sulfur content of phenylmercaptoethyl triethoxysilane of 10.67 wt. percent.

EXAMPLE IV

In a large test tube were placed 28.5 grams (0.15 mole) of vinyl triethoxysilane, 16.5 grams (0.5 mole) of thiophenol and 0.045 grams of dibenzoyl disulfide. The mixture was irradiated with a mercury arc lamp for 23 hours and the product obtained was distilled in a ten-inch helix-packed column. There was obtained 37.6 grams of phenylmercaptoethyl triethoxysilane having a boiling point of 122–126° C. at 0.5 mm. Hg absolute pressure and a refractive index $n_D^{25}$ of 1.4958.

EXAMPLE V

In a 18 x 150 mm. quartz test tube were placed 7.6 grams (0.1 mole) of isopropyl mercaptan, 19.0 grams (0.1 mole) of vinyl triethoxysilane and a trace (0.001 gram) of diphenyl disulfide. The tube was stoppered and exposed to ultra-violet light for 15 hours. Distillation of the reaction mixture in a six-inch helix-packed column yielded 21 grams of isopropylmercaptoethyl triethoxysilane having a boiling point of 111.5°–113° C. at 6 mm. Hg absolute pressure and a refractive index $n_D^{20}$ of 1.4378. Analysis of the product for silicon content disclosed the value of 10.46 wt. percent which compares favorably with the calculated silicon content of isopropylmercaptoethyl triethoxysilane of 10.53 wt. percent.

EXAMPLE VI

In a 18 x 150 mm. quartz test tube were placed 9 grams (0.1 mole) of t-butyl mercaptan, 19 grams (0.1 mole) of vinyltriethoxysilane and a trace of diphenyl disulfide (0.001 gram). After exposure to ultra-violet light for 15 hours, the reaction mixture was distilled in a six-inch helix-packed column and there was obtained 17.1 grams of t-butylmercaptoethyl triethoxysilane. The product has a boiling point of 73–74° C. at 0.5 mm. Hg absolute pressure and a refractive index $n_D^{20}$ of 1.4388. Analysis of the product indicated a silicon content of 9.85 wt. percent which value compares favorably with the calculated silicon content of t-butyl mercaptoethyl triethoxysilane of 10 wt. percent.

EXAMPLE VII

In a 250 ml. flask equipped with a stirrer and a dropping funnel were placed 20 grams of phenylmercaptoethyl triethoxysilane and 100 ml. of dioxane. There was then added 100 ml. of 5% sulfuric acid by means of the dropping funnel with rapid stirring of the reaction mixture. An emulsion was formed and broken in approximately two and one-half minutes, and shortly thereafter the solution became turbid. The polysiloxane formed was extracted from the mixture with ether and the ether mixture subsequently washed with distilled water. The ether solution was distilled and there was obtained approximately 150 ml. of a viscous phenylmercaptoethyl polysiloxane. A portion of the product was placed in an aluminum cup and the cup placed in an oven and heated over a period of 125 hours at temperatures which commensed at 100° C. and which were increased 25° C. after each 24 hour period. A clear hard composition of the sulfur- and silicon-containing polymer was obtained.

EXAMPLE III

In a 500 ml. 3-neck flask equipped with an all glass stirrer, dropping funnel and reflux condenser was placed 36 ml. (28.4 grams, 0.62 mole) of ethanol. With external cooling, 25.3 grams (0.1 mole) of diphenyldichlorosilane was added in a dropwise fashion. The mixture was refluxed for an hour during which time 30 ml. of alcohol was distilled from the clear solution and diphenyldiethoxysilane was formed. There was then added to the flask 28 grams (0.1 mole) of n-butylmercaptoethyl triethoxysilane in a dry chloroform solution. With cooling, 80 ml. of 0.052 N hydrochloric acid was added dropwise over a period of 40 minutes. The mixture was heated at reflux temperature for one hour after which the chloroform layer was separated and washed several times with 50 ml. portions of distilled water. Removal of the chloroform was accomplished by distillation and a clear residual oil was obtained. Analysis of the oil indicated that the ratio of diphenyl siloxane units to n-butylmercaptoethylsiloxane units was 7 to 6.

What is claimed is:

1. A process for preparing compounds having the formula

where R and R' are hydrocarbyl radicals taken from the group consisting of alkyl and aryl radicals which comprises reacting a hydrocarbyl mercaptan with a vinyl trihydrocarbyloxsilane under the influence of ultra-violet light.

2. A process for preparing alkylmercaptoethyl triethoxysilanes which comprises reacting an alkyl mercaptan with vinyl triethoxysilane under the influence of ultra-violet light.

3. A process for preparing compounds having the formula

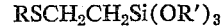

where R and R' are hydrocarbyl radicals taken from the group consisting of alkyl and aryl radicals which comprises reacting a hydrocarbyl mercaptan with a vinyl hydrocarbyloxysilane under the influence of ultra-violet light, and in the presence of a reaction accelerator taken from the group consisting of benzil, dibenzoyl disulfide and diphenyl disulfide.

4. A copolymeric composition of matter containing butyl mercaptoethyl siloxane units and diphenylsiloxane units.

References Cited in the file of this patent

UNITED STATES PATENTS

| 2,486,162 | Hyde | Oct. 25, 1949 |
| 2,563,516 | Burkhard | Aug. 7, 1951 |
| 2,832,754 | Jex et al. | Apr. 29, 1958 |
| 2,835,690 | Prober | May 20, 1958 |

FOREIGN PATENTS

| 1,118,495 | France | Mar. 19, 1956 |

OTHER REFERENCES

Volnov: "Jour. Gen. Chem." (USSR), vol. 10 (1940), pages 1600–1604.

Chem. Abstracts, vol. 39 (1945), page 5963.

Pietrusza et al.: Jour. Am. Chem. Soc., vol. 70, February 1948, pp. 484–486.

Burkhard: Jour. Am. Chem. Soc., vol. 72, March 1950, pp. 1078–80.

Rochow: "Chemistry of Silicones," 2nd Ed., 1951, Wiley and Sons, N.Y., pp. 56–57.

Gilman et al.: "Jour. Am. Chem. Soc.," vol. 75 (1953), pp. 3760–2.

Whitmore et al.: "Journal Am. Chem. Soc.," volume 69, (1947), page 1551.

Eaborn: "Organosilicon Compounds," Butterworths Scientific Publ., London, 1960, page 133.

Cooper: "Jour. Am. Chem. Soc.," volume 76 (July 1954), pages 3713–6.